United States Patent [19]

Lawrenz-Stolz et al.

[11] Patent Number: 5,295,144
[45] Date of Patent: Mar. 15, 1994

[54] LASER

[75] Inventors: Jörg Lawrenz-Stolz; Fedder Petersen; Dörte Wedekind, all of Lübeck, Fed. Rep. of Germany

[73] Assignee: ADLAS GmbH & Co. KG, Lubeck, Fed. Rep. of Germany

[21] Appl. No.: 891,635

[22] Filed: Jun. 1, 1992

[30] Foreign Application Priority Data

Jun. 7, 1991 [DE] Fed. Rep. of Germany ....... 4118819

[51] Int. Cl.$^5$ ............................................. H01S 3/10
[52] U.S. Cl. ......................................... 372/22; 372/21; 372/71; 372/69; 359/328
[58] Field of Search .................. 372/71, 70, 69, 105, 372/21, 22, 34; 359/326, 328, 329

[56] References Cited

U.S. PATENT DOCUMENTS

| | | | |
|---|---|---|---|
| 3,644,842 | 2/1972 | Uchida et al. | 331/94.5 |
| 4,731,787 | 3/1988 | Fan et al. | 372/22 |
| 4,791,631 | 12/1988 | Baumert et al. | 372/22 |
| 4,879,722 | 11/1989 | Dixon et al. | 372/21 |
| 4,884,276 | 11/1989 | Dixon et al. | 372/21 |

FOREIGN PATENT DOCUMENTS

| | | |
|---|---|---|
| 0306136 | 3/1989 | European Pat. Off. . |
| 63-159829 | 11/1988 | Japan . |
| 1-028879 | 5/1989 | Japan . |

OTHER PUBLICATIONS

S. R. Chinn et al., "Spiking Oscillations in Diode-Pumped NdP$_5$O$_{14}$ and NdAl$_3$(BO$_3$)$_4$ Lasers", IEEE J. Quantum Electron., vol. QE-12, No. 3, Mar. 1976, pp. 189-193.

T. Y. Fan et al., "Efficient GaAlAs Diode-Laser-Pumped Operation of Nd:YLF at 1.047 μm with Intracavity Doubling to 523.6 nm", Opt. Lett., vol. 11, No. 4, Apr. 1976, pp. 204-206.

I. Schütz et al., "Miniature Self-Frequency-Doubling CW Laser Pumped By a Diode-Laser", Opt. Comm., vol. 77, No. 2, Jun. 15, 1990, pp. 221-225.

H. Hemmati, "Diode-Pumped Self-Frequency-Doubled Neodymium Yttrium Aluminum Borate (NYAB) Laser", IEEE J. Quant. Electron., vol. 28, No. 4, Apr. 1992, pp. 1169-1171.

*Primary Examiner*—Georgia Y. Epps
*Attorney, Agent, or Firm*—Gottlieb, Rackman & Reisman

[57] ABSTRACT

To produce blue light by means of a laser, pumped light is coupled into a birefringent, nonlinear crystal (5) in a variable frequency laser (1) from a laser diode pumped light source (7, 8, 9) via an input mirror (3). Due to adjustment of the inclination of the crystal (5) or with the aid of tempering means (6) for the crystal, most of the pumped light is absorbed in the crystal (5)—upon suitable polarization of the pumped light—while the rest is available for a frequency mixture of the fundamental Wave of the laser and of the pumped light. Via an output mirror (4) blue laser light with a Wavelength of e.g. 459 nm is coupled out, with a fundamental wave of e.g. 1064 nm and pumped light with a wavelength of e.g. 806 nm.

9 Claims, 1 Drawing Sheet

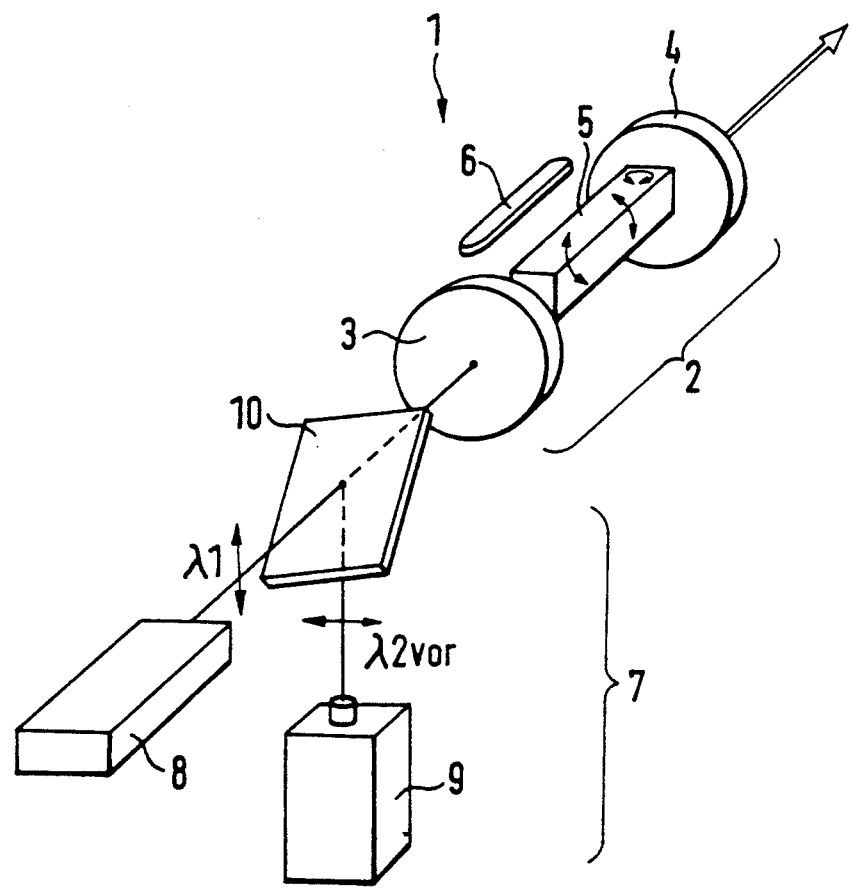

LASER

BACKGROUND OF THE INVENTION

The present invention relates to a laser.

Lasers customarily have a resonator which—in the case of solid state lasers—contains a solid body between two mirrors which is coupled with a pumped light source. The solid body is e.g. a nonlinear crystal which serves as the host crystal for a laser-active medium, such as neodymium. The wavelength of the pumped light is typically about 806 nm for a neodymium laser, for example, so that a laser transition takes place and a fundamental wave of 1064 nm arises.

The quantity of wavelengths is limited in currently available lasers. To obtain additional wavelengths one can provide frequency mixing measures.

BRIEF DESCRIPTION OF THE INVENTION

The invention is based on the problem of providing a laser, in particular a solid state laser, able to provide hitherto unavailable wavelengths.

This problem is solved according to the invention for a laser having a resonator containing a crystal between two mirrors and having a pumped light source, by the following features:

the pumped light and the laser-active medium contained in the crystal are coordinated with the length of the crystal in such a way that the pumped light is almost but not completely absorbed, and phase matching means are provided for frequency mixture of the fundamental wave of the laser and of the pumped light.

Adaptation of the pumped light wavelength to the laser-active medium is known as such. This adaptation is for obtaining a laser transition. According to the invention, however, less than the total energy of the pumped light is absorbed. Part of it is available for frequency mixture.

For this frequency mixture of the fundamental wave of the laser and of the pumped light, phase matching is performed. When this condition for frequency mixture is met one obtains light with mixed frequencies which can be coupled out by the output mirror and used as laser light.

With an NYAB crystal in the resonator the fundamental wavelength is 1064 nm. After pumping with a laser diode which produces light with a wavelength of 806 nm one obtains by frequency mixture blue laser light with a wavelength of 459 nm according to the formula $$1/\lambda_{mix} = 1/\lambda_L + 1/\lambda_P$$

wherein $\lambda_{mix}$ = the wavelength of the laser light produced by frequency mixture, which is coupled out as utilizable light via the output mirror of the resonator, $\lambda_L$ = the fundamental wave of the laser $\lambda_P$ = the wavelength of the pumped light.

As explained above, the pumped light must not be completely absorbed; part of the pumped light energy must be available for frequency mixture. The so-called absorption length of the crystal is selected accordingly. The absorption length depends on the geometrical length of the crystal itself, the concentration of the laser-active medium, e.g. neodymium, the polarization and the wavelength of the pumped light.

One obtains the phase matching e.g. by suitably adjusting the inclination of the crystal axes of the crystal with respect to the optical axis of the laser. Alternatively or additionally to this, one can also influence the temperature of the crystal to obtain the desired phase matching.

The suitable polarization is obtained either by a special polarizer or by corresponding design of the pumped light source, Which is preferably a laser diode. The light emitted by the laser diode is then adjusted to the desired polarization.

The crystal is preferably a birefringent, nonlinear crystal, in particular $YAL_3(BO_3)_4$ or $LiNbO_3$, while the laser-active medium may be Nd, Er, Ho or Tm, for example.

The laser light must run to-and-fro a few times in the resonator. Both mirrors are accordingly designed to be highly reflective for the fundamental wave of the laser. One of the mirrors is designed to be the input mirror for the pumped light, being generally permeable for the wavelength of the pumped light. The other mirror is designed as the output mirror and is accordingly permeable for the mixed frequency.

The inventive laser can be designed particularly favorably as a variable frequency laser. According to the invention the pumped light source has at least one laser diode with variable frequency. For example, the temperature of the laser diode is varied so that the starting frequency of the laser diode varies in accordance with the temperature. Also, the light of two laser diodes can be coupled into the crystal by coupling in polarization, for example, the frequency of the first laser diode being fixed and the frequency of the second laser diode variable. The light of both laser diodes is imaged in the crystal. The mixed frequency is then coordinated with the variable frequency or wavelength by the laser diode. The phase matching then takes place—as explained above - by rotating the crystal to obtain a certain inclination of the crystal axes with respect to the optical axis of the laser, or by suitably tempering the crystal.

BRIEF DESCRIPTION OF THE DRAWING

In the following description an embodiment example of the invention shall be explained in more detail with reference to the single figure of the drawing which is a schematic illustration, in perspective, of the laser of the present invention.

According to the drawing a variable frequency laser has a resonator 2 and a pumped light source 7.

DETAILED DESCRIPTION OF THE INVENTION

Resonator 2 contains an input mirror 3, an output mirror 4 and a birefringent, nonlinear crystal 5 disposed between mirrors 3 and 4. The crystal is a so-called NYAB crystal whose fundamental wave is about 1064 nm. As indicated by double arrows, crystal 5 is adjustable about all axes by a suitable mounting (not shown), permitting virtually any inclination of the crystal axes with respect to the optical axis of the laser.

Associated with resonator 2 is a heating means 6 which is indicated here as a rod-shaped heater. It serves to adjust the temperature of crystal 5.

Pumped light source 7 contains a first laser diode 8 which emits laser light with a wavelength $\lambda_1$ of e.g. 806 nm. The pumped light source also contains a laser diode 9 which emits light with a wavelength $\lambda_2$. Wavelength $\lambda_2$ can be varied by a temperature control unit (not shown) for laser diode 9.

The light with wavelength $\lambda_1$ passes without hindrance through polarization coupler 10, while the light with wavelength $\lambda_2$ is reflected on the side of polarization coupler 10 pointing away from the plane of projection. Both light beams thus pass from laser diodes 8 and 9 through input mirror 3 into crystal 5. The coordination takes place by variation of wavelength $\lambda_2$. To permit frequency mixture in the laser, phase matching takes place in the crystal by adjustment of the inclination of crystal 5 to a suitable value and/or adjustment of crystal 5 to a suitable temperature by heating means 6.

On the sides facing crystal 5 the two mirrors 3 and 4 are highly reflective for the fundamental wave of crystal 5. Input mirror 3 is permeable for the pumped light. To obtain higher intensities of the pumped light in the resonator one can also make both mirrors highly reflective for the pumped light. The resonator is then a Fabry-Perot interferometer for the wavelength of the laser diode. This wavelength must be precisely coordinated with the Fabry-Perot of the interferometer. Output mirror 4 is permeable for the mixed frequency. The wavelength of the laser light obtained by the frequency mixture is 459 nm at a fundamental wave of 1064 nm and a wavelength of 806 nm of the pumped light. One thus obtains blue light at the output of output mirror 4.

We claim:

1. A laser having a resonator containing only one crystal between two mirrors and having a pumped light source, wherein the improvement comprises:
   (a) said crystal is a birefringent, nonlinear crystal, for example $Al_3(BO_3)_4$ or $LiNbO_3$, and contains as a laser-active medium a material such as, for example Nd, Er, Ho, Tm;
   (b) said pumped light and said laser-active medium contained in said crystal are coordinated with the length of said crystal in such a way that said pumped light is almost but not completely absorbed; and
   (c) phase matching mans are provided for mixing the frequencies of the fundamental wave of the laser and of said pumped light in said crystal.

2. The laser of claim 1, wherein said phase matching means comprise means for rotating said crystal so as to adjust the inclination of the crystal axes with respect to the optical axis of the laser.

3. The laser of claim 1, wherein both mirrors are highly reflective for said fundamental wave of the laser, one mirror constitutes an input mirror and is designed to be permeable for said pumped light, and the other mirror constitutes an output mirror and is permeable for the mixed frequency.

4. The laser of claim 1, wherein said pumped light source is designed as a laser diode.

5. The laser of claim 1, wherein said pumped light source has a first laser diode with fixed frequency and a second laser diode with variable frequency, and the light of both laser diodes is coupled into said crystal.

6. The laser of claim 5, wherein said light of both laser diodes is coupled into said crystal via a polarization coupler and an input mirror.

7. The laser of claim 1, wherein both mirrors are highly reflective for said fundamental wave of the laser and highly reflective for said pumped light, and one of said mirrors which constitutes an output mirror is permeable for the mixed frequency.

8. The laser of claim 1, wherein said phase matching means comprise tempering means for said crystal.

9. The laser of claim 1, wherein said phase matching means comprise means for rotating said crystal so as to adjust the inclination of the crystal axes with respect to the optical axis of the laser, and tempering means for said crystal.

* * * * *